(12) United States Patent
Gorbaty et al.

(10) Patent No.: US 10,380,347 B2
(45) Date of Patent: Aug. 13, 2019

(54) HIERARCHICAL RUNTIME ANALYSIS FRAMEWORK FOR DEFINING VULNERABILITIES

(71) Applicant: salesforce.com, inc., San Francisco, CA (US)

(72) Inventors: Sergey Gorbaty, Emeryville, CA (US); Travis Safford, San Francisco, CA (US); Xiaoran Wang, Daly City, CA (US)

(73) Assignee: SALESFORCE.COM., INC., San Francisco, CA (US)

( * ) Notice: Subject to any disclaimer, the term of this patent is extended or adjusted under 35 U.S.C. 154(b) by 246 days.

(21) Appl. No.: 15/177,017

(22) Filed: Jun. 8, 2016

(65) Prior Publication Data

US 2017/0357811 A1    Dec. 14, 2017

(51) Int. Cl.
*G06F 21/00* (2013.01)
*G06F 21/57* (2013.01)
*G06F 16/28* (2019.01)

(52) U.S. Cl.
CPC .......... *G06F 21/577* (2013.01); *G06F 16/282* (2019.01)

(58) Field of Classification Search
CPC .................................................. G06F 21/577
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

*Primary Examiner* — Alexander Lagor
*Assistant Examiner* — Syed M Ahsan
(74) *Attorney, Agent, or Firm* — Schwabe Williamson & Wyatt

(57) ABSTRACT

A runtime analysis framework (RTA) stores a hierarchical list of input tags and a hierarchical list of output tags. The RTA stores defined vulnerabilities that include associated input tags and output tags. During runtime the software application may receive a request from a user system. The RTA assigns an input tag from the hierarchical list of input tags to an object associated with the request and assigns an output tag from the hierarchical list of output tags to a method generating a response to the request. The RTA identifies one of the defined vulnerabilities as a potential vulnerability if the assigned output tag and output tag associated the potential vulnerability are in a same subtree of the hierarchical list of output tags and the assigned input tag and the input tag associated with the potential vulnerability are in a same subtree of the hierarchical list of input tags.

16 Claims, 11 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,477,651 B1 | 11/2002 | Teal |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Ruehen et al. |
| 8,566,301 B2 | 10/2013 | Rueben et al. |
| 8,646,103 B2 | 2/2014 | Jakobson et al. |
| 8,806,450 B1 | 8/2014 | Maharana |
| 9,367,681 B1 | 6/2016 | Ismael |
| 9,824,209 B1 | 11/2017 | Ismael |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0103401 A1 | 5/2004 | Chilimbi |
| 2004/0117771 A1 | 6/2004 | Venkatapathy |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2007/0240141 A1 | 10/2007 | Qin |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0172644 A1 | 7/2009 | Nagarajan |
| 2009/0177744 A1 | 7/2009 | Marlow et al. |
| 2009/0282393 A1 | 11/2009 | Costa |
| 2010/0049792 A1 | 2/2010 | Hao |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0260344 A1 | 10/2012 | Maor |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0173571 A1 | 6/2014 | Gluck |
| 2014/0359537 A1 | 12/2014 | Jackobson et al. |
| 2015/0121533 A1 | 4/2015 | Gluck et al. |
| 2015/0373042 A1 | 12/2015 | Tripp |
| 2016/0006758 A1 | 1/2016 | Holt |
| 2016/0062878 A1 | 3/2016 | Westrelin |
| 2016/0170727 A1 | 6/2016 | Mars |
| 2016/0337400 A1 | 11/2016 | Gupta |
| 2017/0103210 A1 | 4/2017 | Baji |
| 2017/0208093 A1* | 7/2017 | Williams .............. G06F 21/577 |
| 2017/0223043 A1 | 8/2017 | Munoz |
| 2017/0264663 A1* | 9/2017 | Bicket .................... H04L 67/02 |
| 2017/0318045 A1 | 11/2017 | Johns |
| 2017/0344746 A1 | 11/2017 | Tripp |
| 2017/0357811 A1 | 12/2017 | Gorbaty |

\* cited by examiner

US 10,380,347 B2

HIERARCHICAL RUNTIME ANALYSIS FRAMEWORK FOR DEFINING VULNERABILITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to hierarchical scheme for detecting software security vulnerabilities.

BACKGROUND

Software applications may include vulnerabilities or flaws that allow hackers to access data and/or perform actions without authorization. For example, the unauthorized hacker may try to access a database or file on behalf of an authorized user.

Current software analysis programs check for security flaws by trying to test every path through the software application source code. However, the analysis programs only provide snapshot views of the software application and do not test behaviors or states that may occur during actual execution runtime. Security analysis programs may not have access to all application source code and therefore may not be able to test internal code paths for security flaws.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
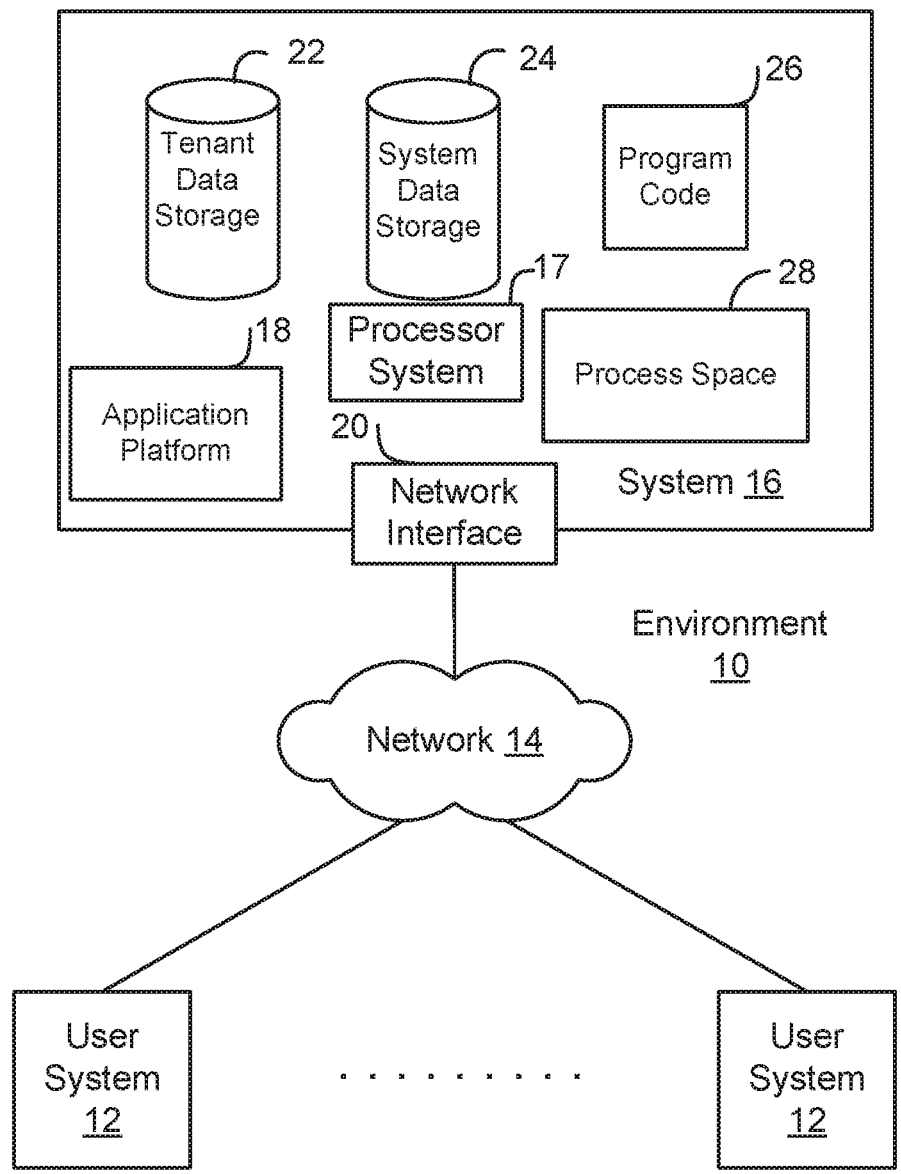
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, Calif. salesforce.com. Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C. C++. HTML, any other markup language, Java™, JavaScript, ActiveX, any other scripting language, such as VBScript, and many other programming languages as are well known may be used. (Java™ is a trademark of Sun Microsystems, Inc.).

Figure 1B:
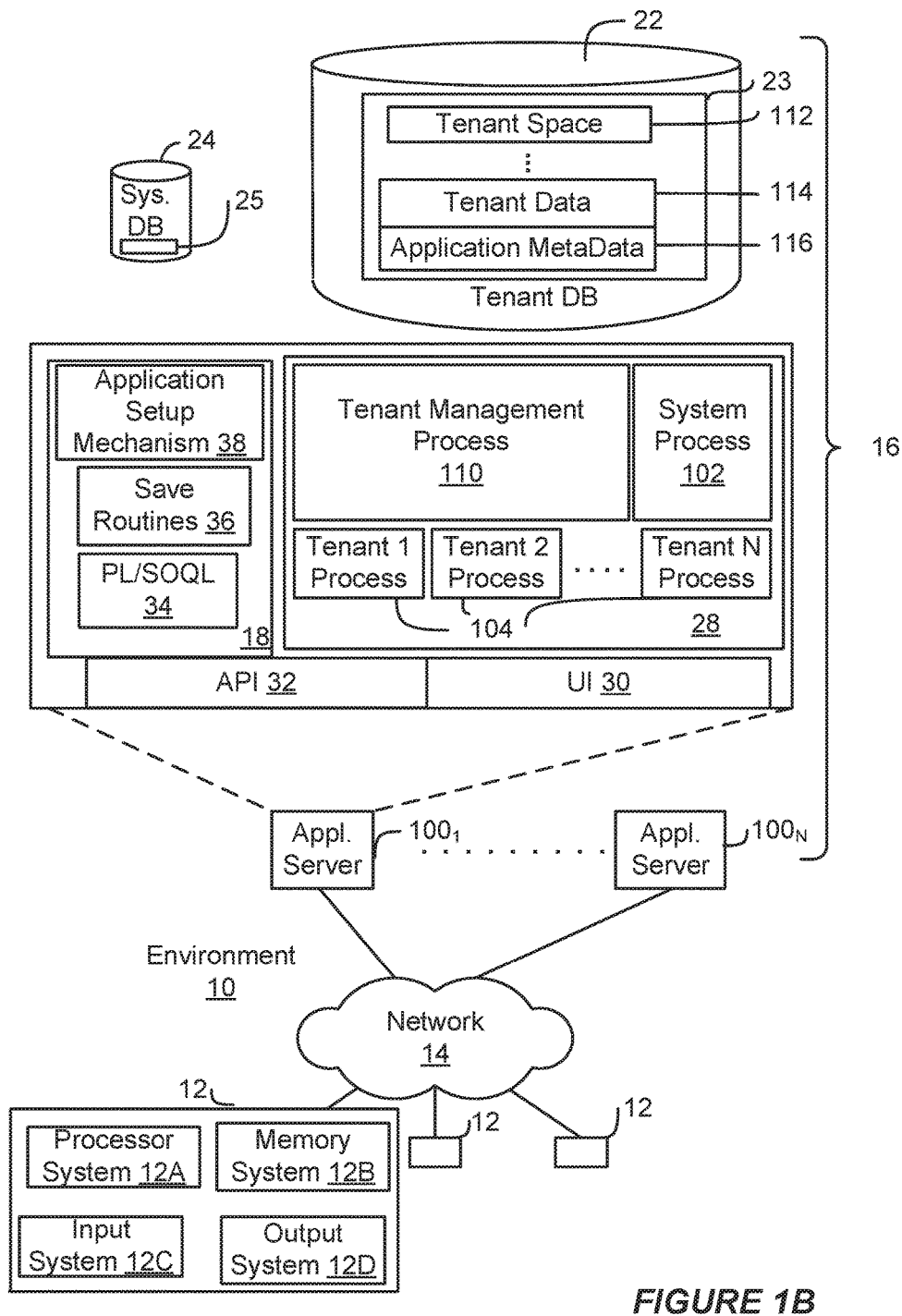
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Runtime Analysis of Software Security Vulnerabilities

A runtime analysis framework (RTA) may embed rules inside a software application to detect security vulnerabilities. Instead of trying to manually test every logical flaw through the software application, the RTA framework may identify potentially malicious requests. The RTA framework then determines if security checks are performed prior to outputting responses to the requests. If no security check is performed, the RTA framework identifies the operation as a security vulnerability.

During runtime of the software application, the runtime analysis framework may assign input tags to objects associated with the user requests. The input tags may identify the requests as potentially malicious and carrying a security risk. The RTA framework then may assign sanitization tags to the objects identifying security checks performed on the objects during runtime.

The RTA framework identifies output responses to the user requests that include the objects and compares the input tags assigned to the objects with any sanitization tags assigned to the objects. The RTA framework may identify the software application as susceptible to a security vulnerability when the input tags for the objects do not include corresponding sanitization tags.

The RTA framework uses the tagging scheme to verify security checks are performed on runtime user flows susceptible to a security vulnerability. By tagging potentially malicious user requests, the RTA framework may not need to exercise or have access to every source code flow within the software application. The RTA framework may use bytecode to implement rules for the tagging scheme without having to access software application source code.

Figure 2:
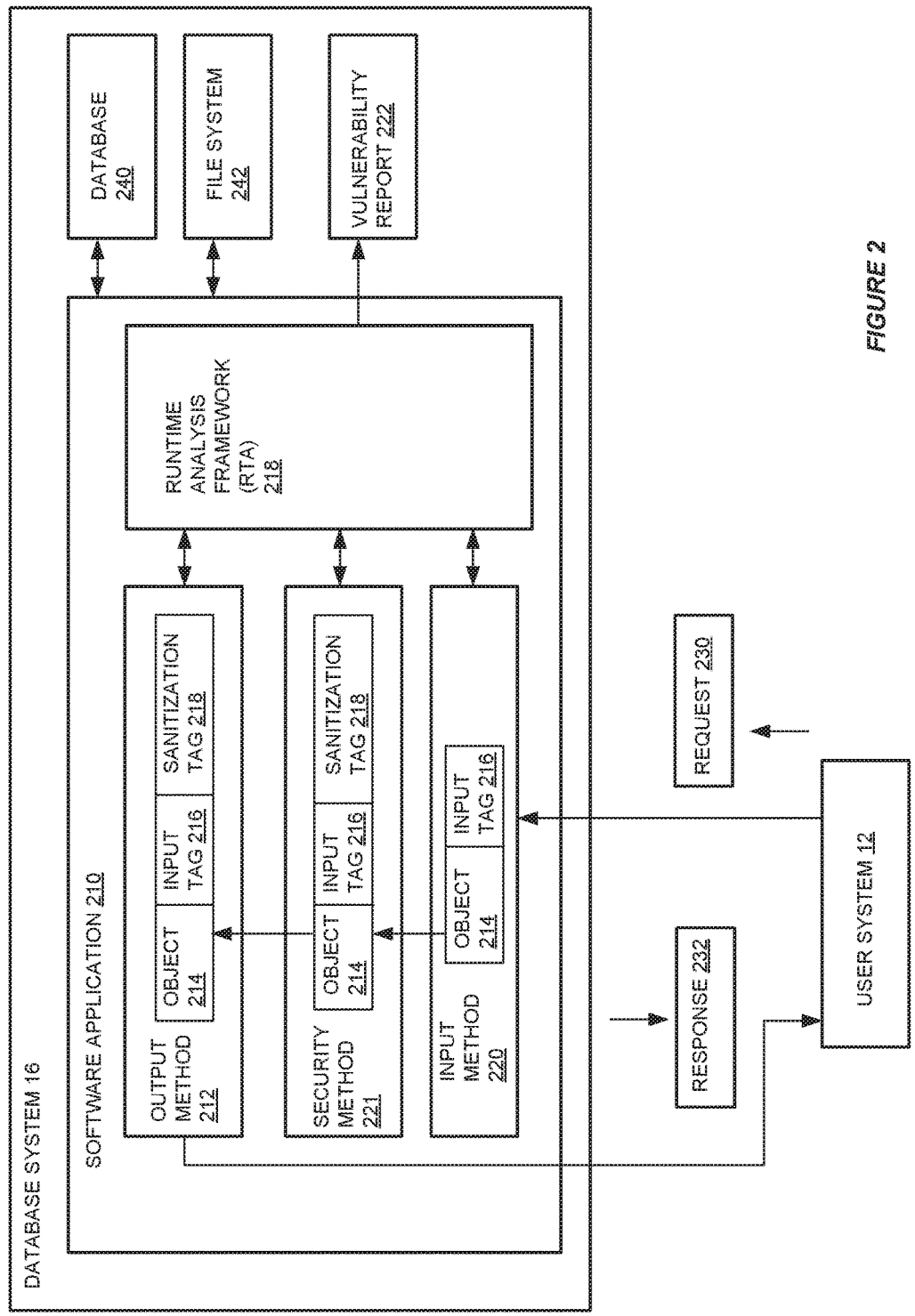
FIG. 2 shows an example runtime analysis framework (RTA) used in a database system.

FIG. 2 shows an example runtime analysis framework (RTA) 218 operating in a software application 210. In one example, software application 210 may operate within a database system 16, receive user requests 230 from user system 12 and provide corresponding responses 232 back to user system 12. This is just one example and software application 210 and RTA 218 may operate within any hardware or software environment that performs any operation. For example, software application 210 may operate within any cloud based or private database system 16 or may operate within a localized software environment within a laptop computer, tablet, smart phone, personal computer (PC), or the like, or any combination thereof.

A user may access database system 16 via user system 12 as described above. For example, the user may be a salesman that stores information about different customers in a customer relationship management (CRM) database system 16. Input methods 220 within software application 210 may create one or more objects 214 from request 230. For example, user system 12 may request information regarding a particular customer name and a Java input method 220 may convert request 230 into one or more objects 214. For explanation purposes, only one object 214 is referred to below. However, it should be understood that software application 210 may create any number of objects 214 based on request 230.

Object 214 may identify the user making request 230 and identify the requested customer name. Any data, message, string, tag, flag, information, method, function, or the like, or any combination thereof created and processed by software application 210 may be referred to generally as an object.

Software application 210 may preform multiple different operations on object 214 pursuant to request 230. For example, software application 210 may access different files in a file system 242, access data in a database 240, and/or access data in memory for information associated with request 230.

Software application 210 also may perform different security checks based on request 230. For example, a security method 221 may perform an access check to determine if the user is authorized to view the requested information. Another security method 221 may scrub request 230 for malware, such as JavaScript.

Software application 210 may eventually call an output method 212 that generates a response 232 to request 230. For example, output method 212 may send a hypertext transfer protocol (HTTP) response to user system 12 for displaying on a web page. Response 232 may include data from object 214, data from database 240, and/or files from file system 242 requested in object 214. Other output methods 212 may store data from object 214 in database 240 or file system 242.

RTA 218 may identify ingress points where software application 210 and database system 16 are vulnerable to security attacks. For example, request 230 from user system 12 may contain viruses or malware. RTA 218 may assign an one or more input tags 216 to object 214 identifying object 214 as potentially malicious and a security risk. For explanation purposes, only one input tag 216 is described below assigned to object 214.

RTA 218 also may assign one or more sanitization tags 218 identifying security checks performed on object 214. For example, RTA 218 may assign a first sanitization tag 218 to object 214 when a security method 221 checks database access rights for the user sending request 230. RTA 218 may assign other sanitization tags 218 for other security operations performed on object 214, such as a security method that scrubs object 214 for malware.

RTA 218 also may identify egress points where software application 210 generates a response 232 or output for request 230. For example, RTA 218 may identify output method 212 as an egress point where response 232 is sent back to user system 12. RTA 218 may identify the path from input method 220 to output method 212 as potential security vulnerability, since input method 220 generates object 214 from a user request 230 and output method 212 outputs a response 232 associated with the user request object 214.

RTA 218 uses input tag 216 and sanitization tag 218 to confirm proper security checks are performed on object 214. Any object 214 with an input tag 216 and no corresponding sanitization tag 218 is identified as a vulnerability in report 222. As mentioned above, RTA 218 may assign multiple sanitization tags 218 to object 214 for each different security check. RTA 218 may determine if object 214 includes all of the proper sanitization tags 218 associated with input tag 216. RTA 218 may identify a vulnerability when any of the multiple sanitization tags 218 are missing.

In summary, RTA 218 identifies potential vulnerabilities in software application 210 by assigning an input tag 216 to object 214. RTA 218 confirms proper security operations are performed by assigning associated sanitization tags 218 to object 214. During output method 212, RTA 218 then checks object 214 for any input tag 216 and associated sanitization tags 218. RTA 218 identifies a vulnerability in report 222 when object 214 includes input tag 218 but does not include the proper sanitization tags 218. RTA 218 may consider an object 214 without an input tag 216 as not potentially malicious, since the object 214 is not from a user request 230.

The tagging scheme in RTA 218 may operate during normal execution of software application 210 and therefore identify actual runtime vulnerabilities. RTA 218 assigns and checks input tags 216 and sanitization tags 218 based on identified input methods 220, security methods 221, and output methods 212. This allows RTA 218 to identify vulnerabilities without having to access individual lines of source code in software application 210.

Figure 3:
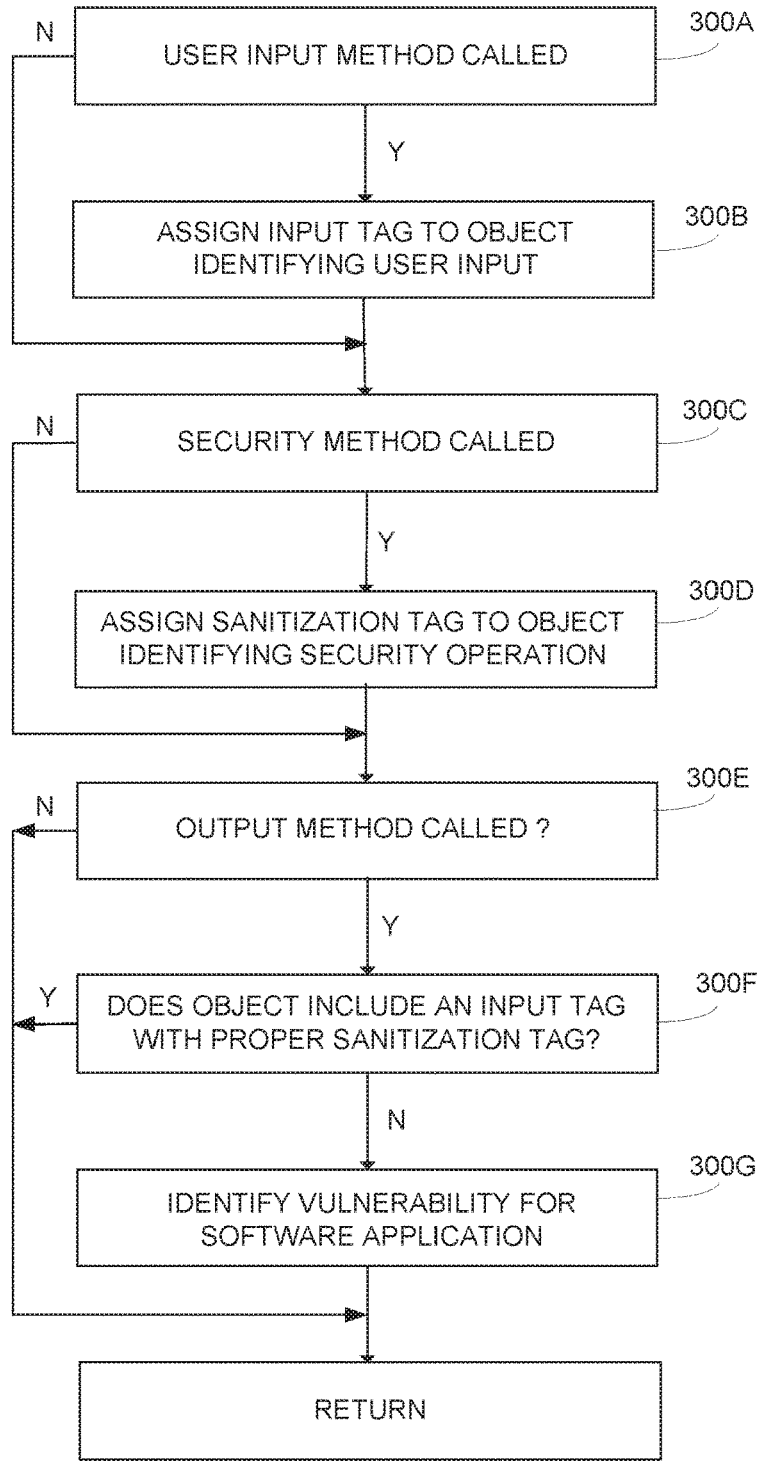
FIG. 3 shows an example process performed by the runtime analysis framework.

FIG. 3 shows an example process for detecting a software vulnerability. In operation 300A, the RTA may detect the software application calling a user input method. For example, the software application may receive a request that includes a universal resource locator (URL) sent from a user web browser.

In operation 300B, the RTA may assign an input tag to the object from the input method. For example, the RTA may assign an input tag identifying the object generally as a user input or more specifically as a user URL input.

In operation 300C, the RTA may identify one or more security methods called by the software application. For example, a security operation may perform a database access check confirming the user has authorization to access the data requested by the object. In operation 300D, the RTA may assign a sanitization tag to the object identifying the type of security check performed on the object.

In operation 300E, the RTA may detect the software application calling an output method. For example, the software application may call a method that outputs data associated with the object to a web page, database, or file.

In operation 300F, the RTA compares any input tags assigned to the object with any sanitization tags assigned to the object. For example, the RTA may first determine if the object includes an input tag indicating the object came from a user and is potentially malicious and may be a security risk.

If an input tag exists, the RTA may determine if the object includes one or more corresponding sanitization tags for security operations performed on the object. For example, if the output method outputs data from a database, the sanitization tag may indicate a database access check was performed confirming the user has rights to access the data from the database.

In operation 300F, the RTA may determine there is no vulnerability when no input tag is assigned to the object indicating the object is not associated with a user request. The RTA also may determine there is no vulnerability when the object includes an input tag and one or more proper sanitization tags. This indicates the software application performed the proper security checks on an potentially malicious object.

The RTA may identify an object with an assigned input tag and no sanitization tag. This may indicate a vulnerability since the software application did not perform any security check on the potentially malicious user input object. In operation 300G, the RTA may identify the vulnerability by logging the name and line number of the output method.

In operation 300F, the RTA may identify an object with an input tag and a sanitization tag. However, the sanitization tag may not be the proper sanitization tag. This may indicate a vulnerability since the software application did not perform the proper security check on the object prior to generating a response. In operation 300G, the RTA may identify a vulnerability by logging the name and line number of the output method.

In one example, some or all of the operations described above are performed during execution runtime while of the software application is receiving user requests and generating associated responses. In another example, some or all of the operations may be performed offline in a testing environment using test inputs.

Figure 4:
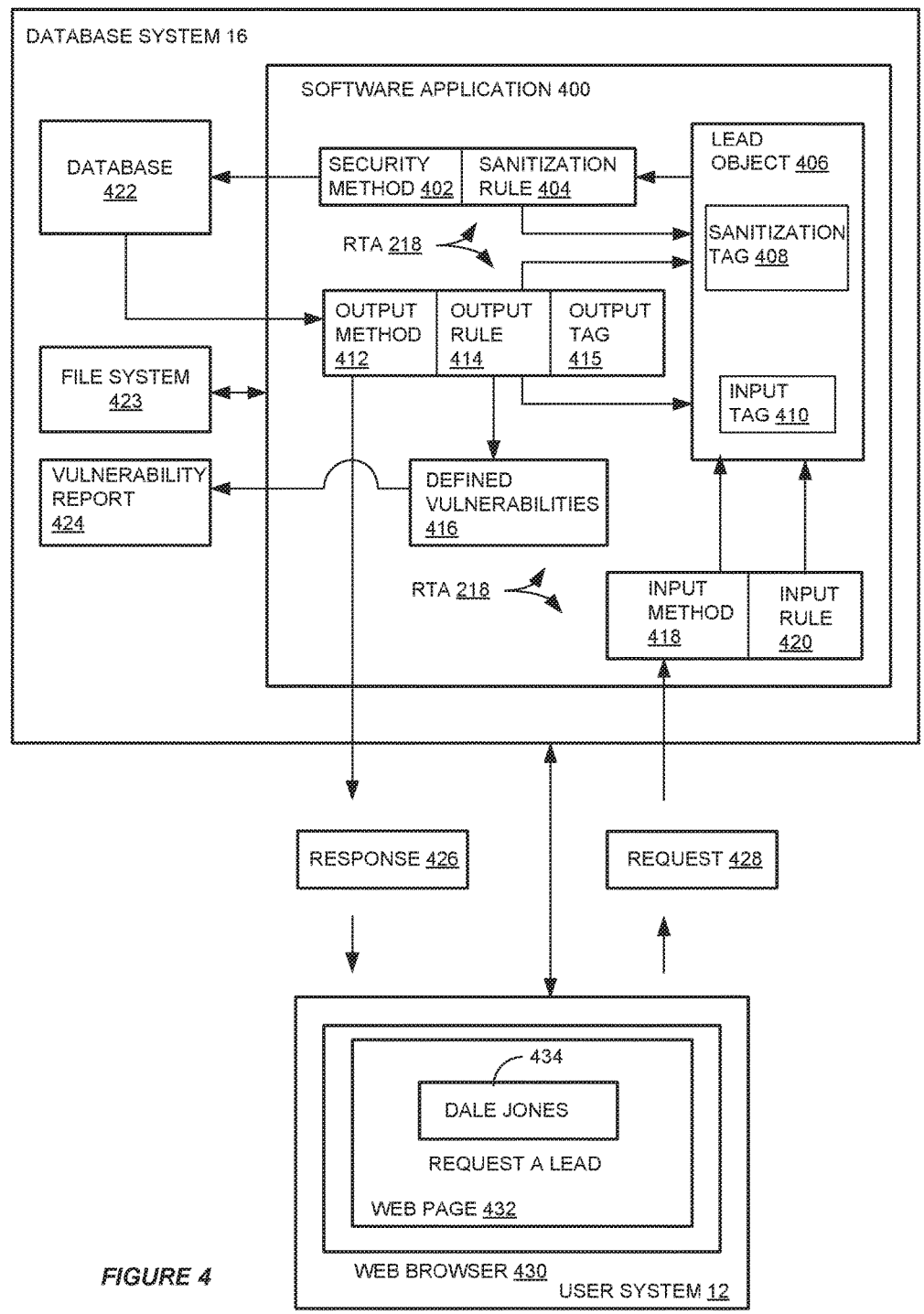
FIG. 4 shows an alternative example of the runtime analysis framework.

FIG. 4 shows another example of runtime analysis framework (RTA) 218 located in a software application 400. As mentioned above, software application 400 may perform any operation within any computer software environment. For example, software application 400 may be customer relationship management (CRM) software or any other type of cloud computing software.

RTA 218 may identify all normal ingress and egress operations in software application 400, such as receiving request 428 from a web browser 430 operating on user system 12, accessing a database 422 or file system 423, and writing/printing responses 426 back to a web page 432 on a web browser 430. RTA 218 also may identify security checks performed during software application 400. RTA 218 may identify vulnerabilities in software application 400 based on the identified inputs, outputs, and security checks.

For example, a user of user system 12 may use web browser 430 to request information regarding a sales lead 434. The user may send request 428 for lead 434 to database system 16. An input method 418 in software application 400 may create a lead object 406 in response to lead request 428. Lead object 406 may identify the user on user system 12 and identify lead 434.

An RTA input rule 420 may include software added to software application 400 that assigns input tag 410 to any object 406 created by input method 418. For example, a hacker may have entered malware into request 428 and associated object 406. In another example, a user may simply try to view a record in database system 16 without proper authorization. Input rule 420 may attach input tag 410 identifying lead object 406 as potentially malicious and then transfer operation back to input method 418.

One or more input rules 420 may exist within software application 400. Any input method 418 that receives an input or any other potentially malicious data may include an associated input rule 420. Each input rule 420 may assign an input tag 410 that identifies the type of data within object 406. As mentioned above, request 428 may produce multiple objects 406 that trigger multiple different input rules 420 to each assign input tags 410 to one or more of the multiple objects 406. Again, for explanation purposes only a single object 406 and input tag 410 are shown.

Lead object 406 may travel through different logical paths of software application 400. For example, software application 400 may call a security method 402 to perform a security check on lead object 406 prior to accessing database 422. Software application 400 then may call an output method 412 to output data from database 422 back to user system 12.

One or more RTA sanitization rules 404 may include software added to software application 400 that attach sanitization tags 408 to lead object 406. For example as mentioned above, security method 402 may perform a security check to confirm the user identified in lead object 406 is authorized to access database 422. Sanitization rule 404 may attach sanitization tag 408 to lead object 406 during security method 402 and then return control back to security method 402.

One or more RTA output rules 414 may include software added to software application 400 that assign one or more output tags 415 to associated output methods 412. For example, an output method 412 may output lead data requested in lead object 406 to web page 432 on user system 12.

In one example, RTA 218 may store a list of defined vulnerabilities 416 in memory. Defined vulnerabilities 416 may identify the appropriate sanitization tags for different input and output tags. Output rule 414 may compare output tag 415, input tag 410, and sanitization tag 408 with defined vulnerabilities 416.

Based on the comparison, RTA 218 may determine the code path of lead object 406 through software application 400 is either vulnerable to a security attack or not vulnerable to a security attack. For example, RTA 218 may identify a defined vulnerability 416 with an associated output tag and input tag that match output tag 415 for output method 412 and input tag 410 for lead object 406, respectively.

RTA 218 may identify a vulnerability when the sanitization tags in the identified defined vulnerability 416 do not match sanitization tags 408 assigned to lead object 406. RTA 218 then may identify the defined vulnerability 416, input method 418 and/or output method 412 as an actual vulnerability in report 424.

RTA 218 may determine the defined vulnerability 416 is not an actual vulnerability when the sanitization tags in defined vulnerability 416 match sanitization tags 408 assigned to lead object 406. In other words, RTA 218 confirms software application 400 performed the proper security check on lead object 406 prior to outputting the lead data back to user system 12.

RTA 218 may determine any object 406 with no input tag 410 is not potentially malicious since the object did not come from a user input request. RTA 218 may identify any object 406 with an input tag 410 but no sanitization tags 408 as potentially malicious since no security operations were performed on the user input request. RTA 218 then may identify the portion of software application 400 including output method 412 as vulnerable to a security risk.

Some defined vulnerabilities 416 may include multiple different sanitization tags 408. For example, a defined vulnerability 416 may require multiple different security checks. RTA 218 may identify a vulnerability when object 406 does not include each of the different sanitization tags in defined vulnerability 416.

Software application 400 may write multiple different pieces of data to web page 432. For example, the data may include a logo and text. The logo may come from a static file in file system 423 or database 422 and may not be potentially malicious. RTA 218 may not attach an input tag 410 to the logo. However, the text may include data from request 428 that is potentially malicious.

RTA 218 may assign an input tag 410 to the object associated with the text and may not assign an input tag 410 to the object associated with the logo. RTA 218 then may confirm the text object includes an associated sanitization tag. RTA 218 may not need to confirm the logo object includes any associated sanitization tag since the logo object does not include an input tag.

Input tags 410, sanitization tags 408, and output tags 415 are alternatively referred to as event tags, flags, events and may include any other type of identifier. RTA 218 may assign the event tags identifying potential vulnerabilities to any method, object, or any other operation or data within software application 400.

RTA 218 may more easily identify vulnerabilities for existing or new functions in software application 400. For example, RTA 218 may define a new potential vulnerability simply by adding a new rule to software application 400 that assigns a new input tag, sanitization tag, or output tag for the new method. RTA 218 then may add a new defined vulnerability 416 that includes the tags associated with the new method.

Figure 5:
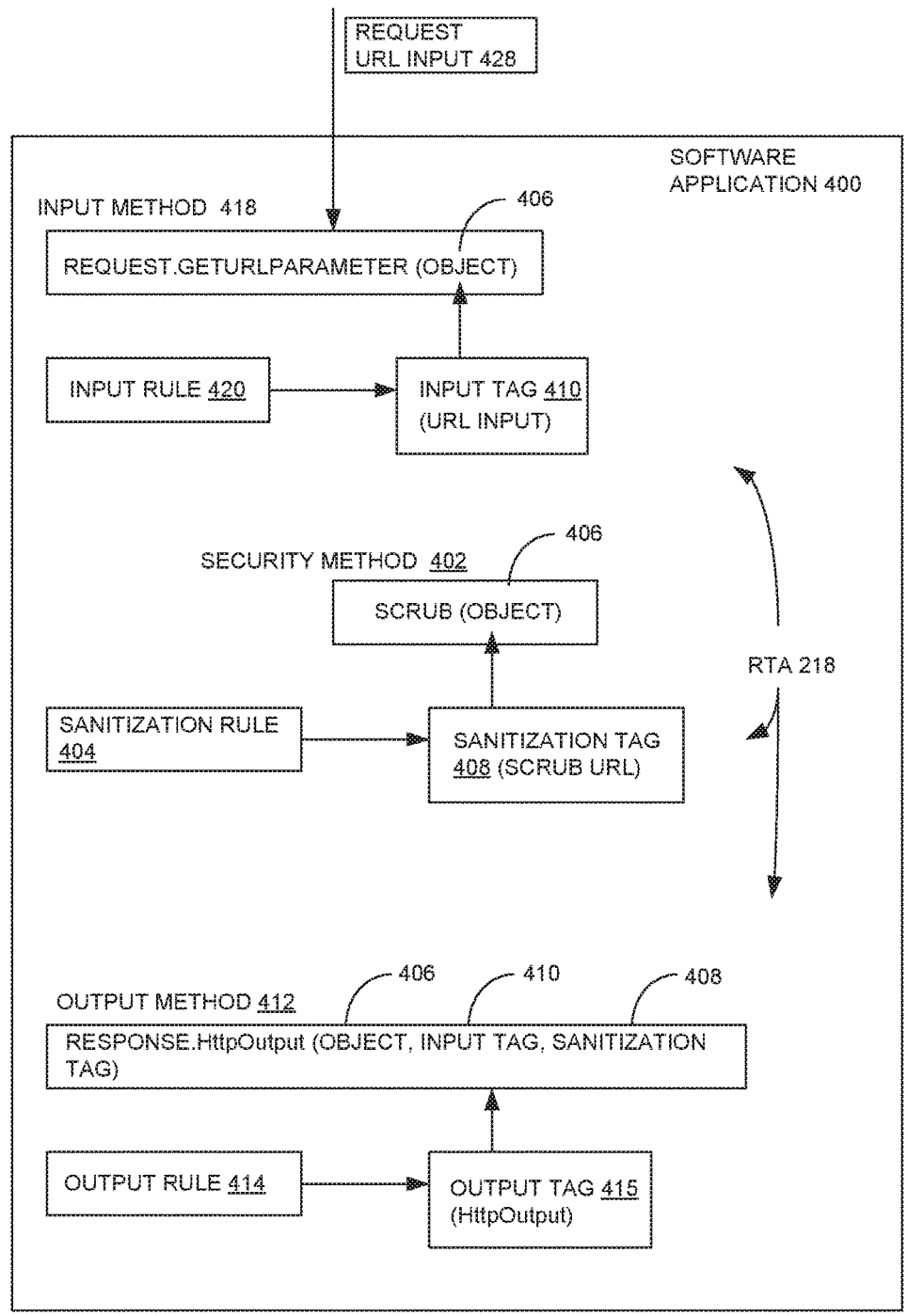
FIG. 5 shows rules used by the runtime analysis framework.

FIG. 5 shows rules used by RTA 218 in more detail. In one example, software application 400 receives a URL input 428 from the user system 12 in FIG. 4. Software application 400 calls input method 418 to process URL input 428, such as getURLparameter( ). Input method 418 may create object 406 for URL input 428.

Input rule 420 may comprise bytecode that automatically assigns input tag 410 to object 406 when software application 400 calls input method 418. Input tag 410 may be any type of user identifier added to object 406. For example, input tag 410 may be series of bits or characters added to a data string for object 406. In one example, input tag 410 may identify the particular type of user input, such as a URL input.

Sanitization rule 404 may comprise bytecode that automatically assigns sanitization tag 408 to object 406 when software application 400 calls security method 402. Sanitization tag 408 also may be another series of bits or characters added to the data string of object 406. In one example, sanitization tag 216 may identify a particular type of security operation performed by security method 406, such as a security operation that scrubs object 406 for JavaScript.

As mentioned above, software application 400 may perform multiple security checks based on request 428. For example, software application 400 may perform the scrub operation of security method 402. Software application 400 also may perform a database access check to determine if the user has authorization to access a requested database record. RTA 218 may add multiple sanitization tags 408 identifying each security check performed on object 406.

Output rule 414 may comprise bytecode that automatically assigns output tag 415 when software application 400 calls output method 412. In one example, output tag 415 may identify a particular type of output operation performed by output method 212, such as a HttpOutput( ). Other output rules 414 may attach output tags 415 that identify other types of output methods, such as methods that write to files, databases, and/or web pages.

Figure 6:
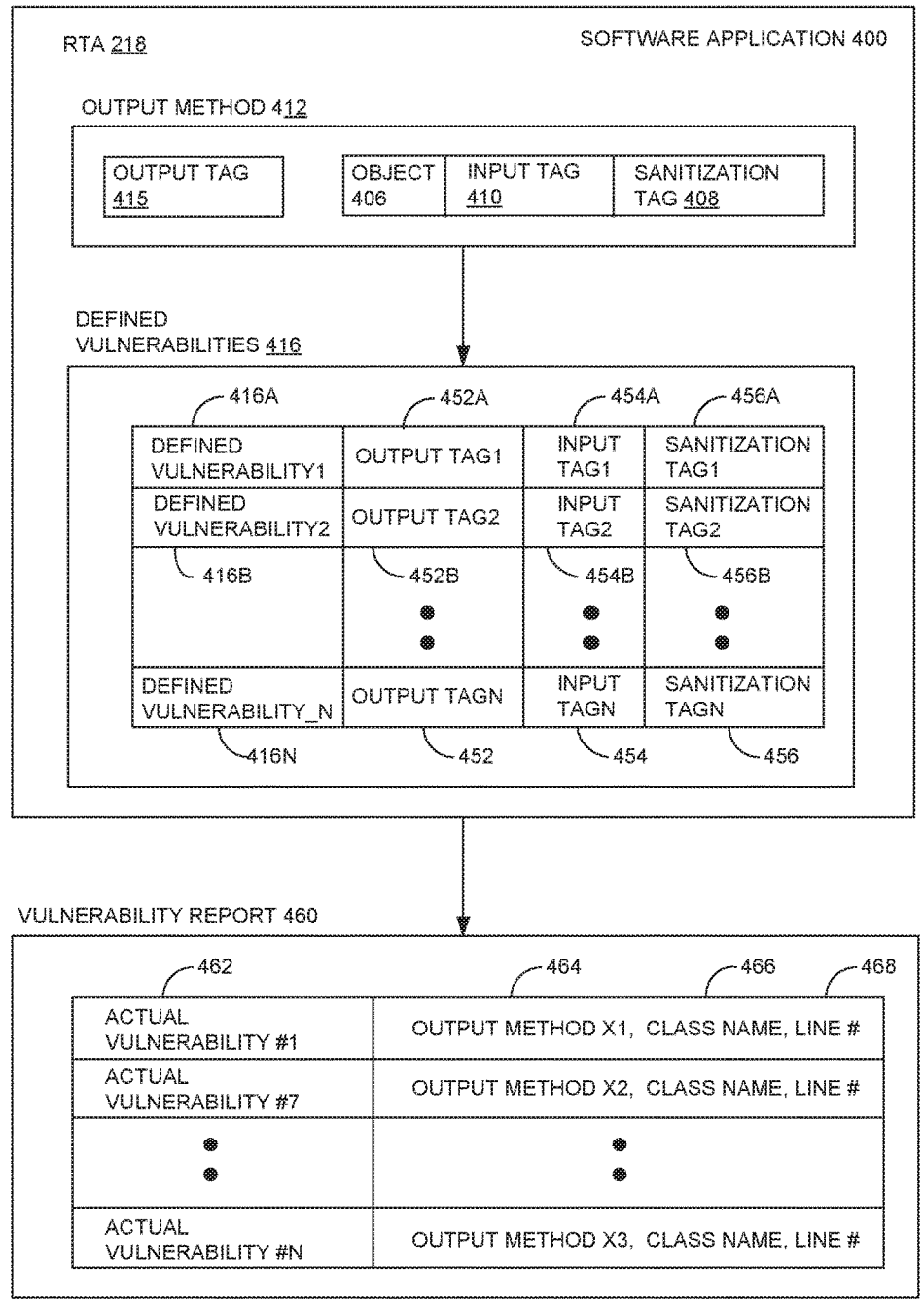
FIG. 6 shows in more detail how the runtime analysis framework may detect a security vulnerability.

FIG. 6 shows an example process for detecting a vulnerability in software application 400. As mentioned above, RTA 218 may store defined vulnerabilities 416 in memory that each includes an output tag 452, an input tag 454, and sanitization tags 456.

In one example, defined vulnerability 416A may identify a cross site scripting (XSS) vulnerability where a user input may include JavaScript that software application 400 could output to a web page. Defined vulnerability 416A may include an output tag 452A for an output method that prints an object to a web page, such as a HttpOutput( ) method.

Defined vulnerability 416A also may include an input tag 454A associated with the XSS vulnerability. For example, input tag 454A may identify an object received from a user web page, such as an object generated by a URLInput( ) method. Defined vulnerability 416A also may include one or more sanitization tags associated with the cross site scripting vulnerability. For example, a sanitization tag 456A may identify a security method that scrubs objects for JavaScript.

Tagging output method 412 with output tag 415 may trigger RTA 218 to perform a vulnerability test. RTA 218 first may determine if output tag 415 for output method 412 matches any defined output tags 452 for defined vulnerabilities 416. RTA 218 may determine output method 412 has no actual vulnerabilities when output tag 415 does not match any output tags 452 in defined vulnerabilities 416.

Otherwise, RTA 218 may identify one or more defined vulnerabilities 416 with matching output tags 452. In one example, output tag 415 may match output tag 452A for defined vulnerability 416A. RTA 218 then compares assigned input tag 410 for object 406 with input tag 454A in defined vulnerability 416A.

RTA 218 may disregard defined vulnerability 416A if object 406 does not include a matching input tag 454A. For example, assigned output tag 415 may match defined output tag 452A, but assigned input tag 410 for object 406 may not match defined input tag 454A. In another example, object 406 may not have an input tag 410. For example, object 406 may not be associated with a user input request. RTA 218 also may disregard defined vulnerability 416A since object 406 does not include a matching input tag.

RTA 218 checks for matching sanitization tags when assigned output tag 415 for output method 412 and assigned input tag 410 for object 406 match defined output tag 452A and defined input tag 454A, respectively. For example, RTA 218 compares assigned sanitization tag 408 for object 406 with sanitization tag 456A for defined vulnerability 416A.

Defined vulnerability 416A is not considered an actual vulnerability when security flags 408 and 456A match. This indicates software application 400 performed the proper security check prior to outputting data associated with object 406. However, defined vulnerability 416A is considered an actual vulnerability when object 406 does not have an assigned sanitization tag 408 or has an assigned sanitization tag 408 that does not match sanitization tag 456A. No assigned sanitization tag 408 may indicate software application 400 performed no security checks on object 406. A non-matching sanitization tag 408 may indicate software application 400 performed a security check, but not the proper security check identified by sanitization tag 456A.

RTA 218 identifies an actual vulnerability 462 in report 460 when assigned sanitization tag 408 does not match defined sanitization tag 456A. For example, RTA 218 may identify an actual vulnerability 462 in report 460 that includes a name 464, class name 466, and line number 468 for output method 412.

RTA 218 may identify actual vulnerabilities 462 for any other objects in output method 412 or for any another objects in any other output methods in software application 400. For example, RTA 218 may identify other methods 412 with an output tag 415 and input tag 410 matching corresponding output and input tags in defined vulnerabilities 416, but without non-matching sanitization tags 456.

Multiple vulnerabilities may be associated with output method 412 and object 406. For example, in addition to the XSS security check, software application 400 might need to perform a database access check to confirm the user has authorization to view a particular requested database record. A second defined vulnerability 416B may include a same or different output tag 452B and input tag 454B as defined vulnerability 416A, and may include a different sanitization tag 456B associated with a database access check.

RTA 218 may identify a second match between the same or other assigned tags 415 and 410 and defined tags 452B and 454B, respectively. RTA 218 then may compare the assigned sanitization tags 406 for object 406 with defined sanitization tag 456B. RTA 218 identifies output method 412 as an actual vulnerability in report 460 when no assigned sanitization tags 408 for object 406 match defined sanitization tag 456B. Defined vulnerability 416B is disregarded when one of the assigned sanitization tags 408 for object 406 matches defined sanitization tag 456B.

A Java compiler may convert source code for software application 400 into bytecode. In one example, RTA 218 may be implemented in JavaScript object notation (JASON) code. A code generation tool converts the JASON for RTA 218 into Java bytecode. At runtime the bytecode is converted into machine code by a just in time Java compiler.

Using bytecode allows RTA 218 to be integrated with bytecode for software application 400 without having to access associated source code. The bytecode may include a finite set of instructions more easily identified and tagged by the RTA rules. RTA 218 also may be implemented in any other languages, such as C++, basic, etc.

III. Hierarchical Runtime Analysis Framework for Defining Vulnerabilities

The RTA framework may use a hierarchical tagging scheme to identify vulnerabilities in the software application. The runtime RTA framework may store a hierarchical list of input tags and a hierarchical list of output tags. The RTA stores defined vulnerabilities that include associated input tags and output tags. During runtime the software application may receive a request from a user and system. The RTA assigns an input tag from the list of input tags to an object associated with the request and assigns an output tag from the list of output tags to a method generating a response to the request.

The RTA identifies defined vulnerabilities as candidate vulnerabilities if the assigned output tag and output tag associated the defined vulnerability are within a same subtree in the list of output tags. The RTA identifies the candidate vulnerabilities as potential vulnerabilities when the assigned input tag and the input tag associated with the candidate vulnerability are also within a same subtree in the list of input tags. The hierarchical tagging scheme allow new defined vulnerabilities and tagging rules to more easily be added to the RTA framework.

Figure 7:
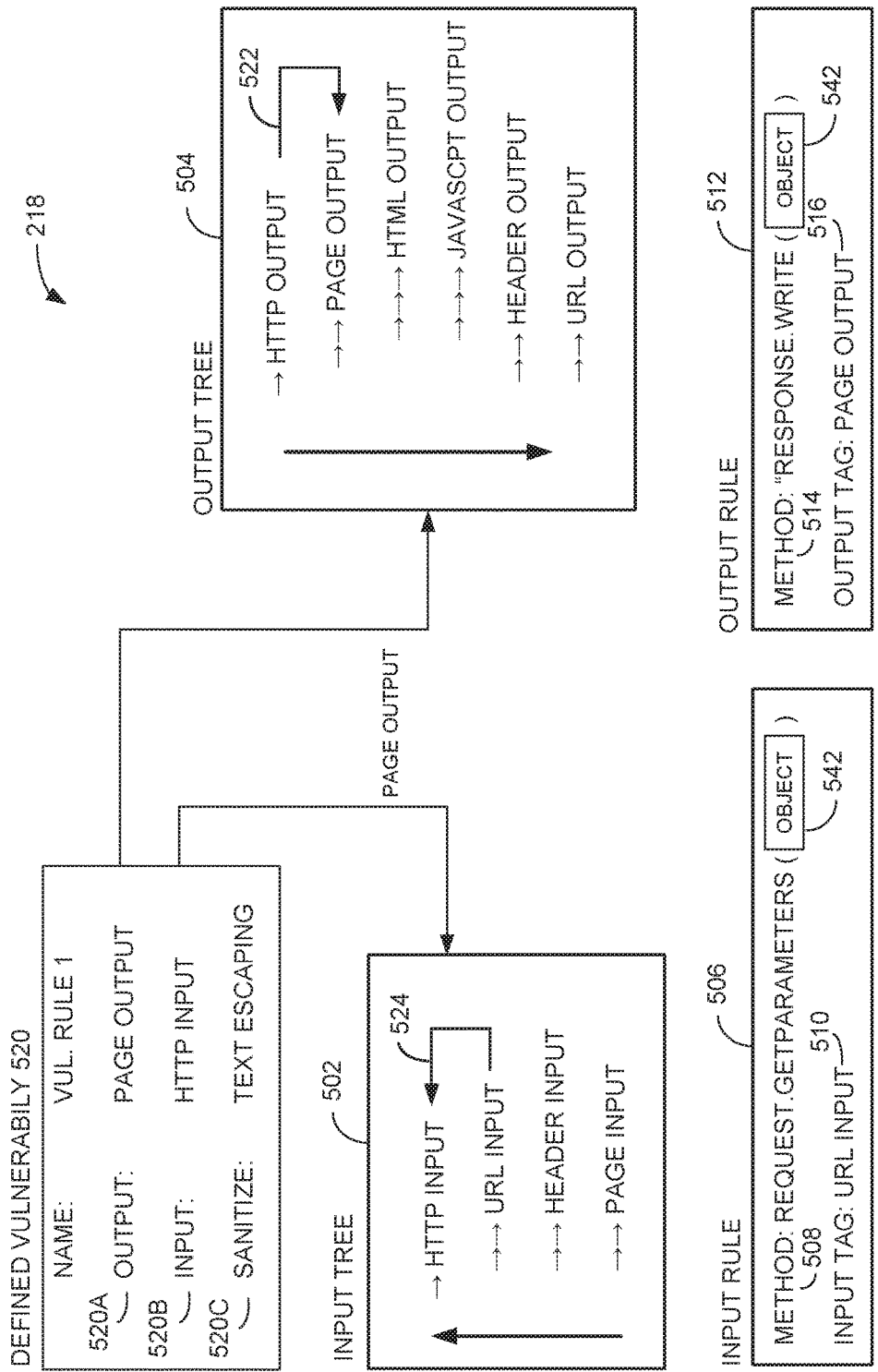
FIG. 7 shows an example hierarchical tagging scheme used by the RTA.

Referring to FIG. 7, the hierarchical tagging scheme may include a hierarchical input tree 502 defining a hierarchy of requests or inputs received by the software application. For example, input tree 502 may define an HTTP input as including any one of a URL input, a header input, and/or a page input. In this example, the URL input, header input, and page input are all defined as child siblings of the HTTP input.

The hierarchical tagging scheme also may include an output tree 504 that defines a hierarchy of responses or outputs generated by the software application. For example, an HTTP output may include a page output, a header output, and/or a URL output. The page output may include any one of a HTML output and/or a JavaScript output. The page output, header output, and URL output are all defined as child siblings of the HTTP output. The HTML output and JavaScript outputs are defined as child siblings of the page output.

These are just examples of inputs received by the software application or responses output by the software application. Any input or output may be defined within input tree 502 and output tree 504, respectively. For example, input tree 502 and output tree 504 may further define a hierarchical list of inputs and outputs, for pages, files, and databases, etc.

The RTA framework uses input tree 502 and output tree 504 to abstract inputs, outputs, and vulnerability rules to different selectable levels. Input rules may assign input tags 510 to objects 542 returned by an input method 508 according to the hierarchical input tag structure in input tree 502. For example, input rule 506 may assign a URL input tag 510 defined in input tree 502 to request.getParameters( ) method 508. URL input tag 510 is a child of the HTTP input tag and a sibling to the header input tag and the page input tag.

Output rules 512 may assign output tags 516 to output methods called by the software application according to the hierarchical output tag structure in output tree 504. For example, output rule 512 may assign a page output tag 516 defined in output tree 504 to response.write( ) method 512. Page output tag 516 is a child of the HTTP output tag and a sibling of the header and URL output tags. Page output tag 516 also includes child HTML and JavaScript output tags.

The hierarchical tagging allows RTA 218 to add new input and output rules without having to alter/amend specific defined vulnerabilities 520. Rules 506 and 512 only need to assign tags corresponding to associated input or output methods. Defined vulnerabilities 520 then classify any new or different input or output tag within a subtree of input tree 502 and output tree 504, respectively.

For example, defined vulnerability 520 may identify a generic output 520A corresponding to one of the outputs in output tree 504 and identify a generic input 520B corresponding to one of the inputs in input tree 502. Defined vulnerability 520 also may include a sanitization tag 520C similar to sanitization tags described above that identifies a sanitization operation the software application is expected to perform on the tagged object.

Output tag 516 is assigned to output method 514 during runtime and triggers the RTA framework to perform a hierarchical vulnerability verification. RTA 218 first determines the hierarchical relationships between output tag 516 assigned to output method 516 and any defined vulnerabilities 520. For example, RTA 218 identifies a subtree 522 by walking down output tree 504 from the root HTTP output tag to page output tag 516. Defined vulnerability 520 identifies a candidate vulnerability since page output 520A is located in subtree 522.

Identified as a candidate vulnerability, RTA 218 next determines the hierarchical relationship between input tag 510 assigned to object 542 and input 520B in defined vulnerability 520. RTA 218 identifies subtree 524 by walking up input tree 502 from more specific URL input tag 510 to the HTTP input 520B. Defined vulnerability 520 is identified as a potential vulnerability since page output 520A is located within subtree 522 and HTTP input 520B is located within subtree 524. In other words, page output tag 516 is a type of page output 520A and URL input tag 510 is a type of HTTP input 520B.

RTE 218 compares the sanitization tags assigned to object 542 with sanitization 520C in potential vulnerability 520. For example, as described above, RTE 218 determines if object 542 includes a sanitization tag matching text escaping sanitization 520C in potential vulnerability 520. If so, the software application performed the correct sanitization operation for the identified input and output operations. If not, RTA 218 identifies output method 508 as a vulnerability in the software application.

As described above, defined vulnerability 520 may identify any type of sanitization operation, such as a text escaping sanitization where the software application prints data on the page; an access check where the software application confirms access rights to view data in a page, file or database; or a ScrubURL check where the software application checks for JavaScript before redirecting an object to another location.

Defined vulnerability 520 identifies particular sanitization operations that the software application should perform based on where an object is received and where the object is eventually output. For example, an object may come from the body of webpage and may be output to a file. The software application may need to perform one or more particular sanitizations for the object based on the type of body input and the type of file output.

The tree structure in input tree 502 and output tree 504 allow a same defined vulnerably 520 to generically encompass multiple different types of inputs and outputs at different file, database, and HTTP levels, etc. For example, defined vulnerability 520 with page output 520A may encompass a subtree of output tags that may include page output tags, HTML output tags, and JavaScript output tags. Similarly, defined vulnerability 520 with HTTP input 520B may encompass a subtree of input tags that include HTTP input tags, URL input tags, header input tags, and page input tags. This prevents having to define new vulnerabilities 520 and create new event tags 510 and 516 for each new input method 508 and each new output method 514.

Figure 8:
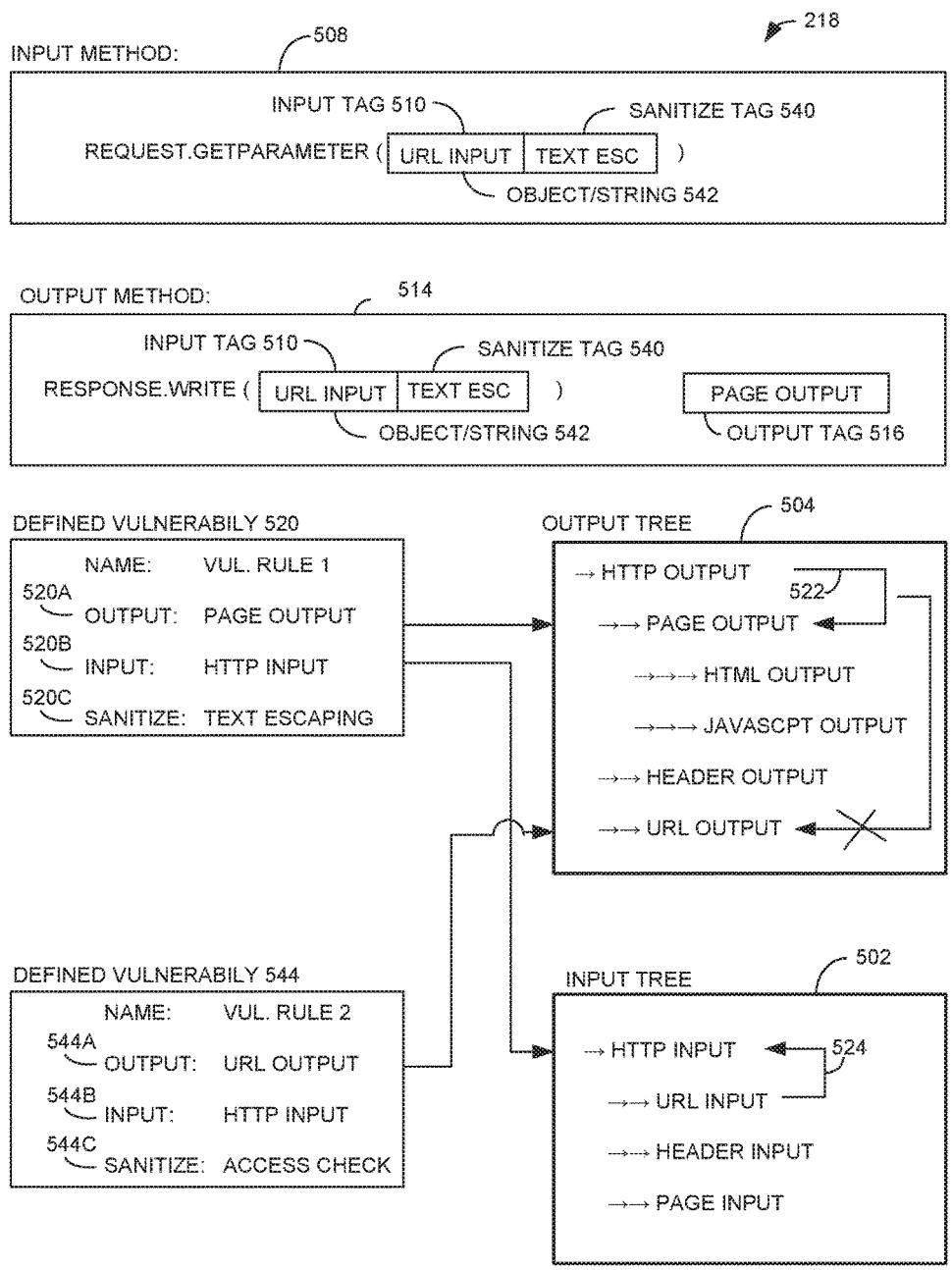
FIG. 8 shows the hierarchical tagging scheme of FIG. 7 in more detail.

FIG. 8 describes the hierarchical tagging scheme of FIG. 7 in more detail. A user system may send a request that causes the software application in the database system to call request.getParameter( ) input method 508. Input method 508 may return an object or string 542. Input rule 506 in FIG. 7 may attach input tag 510 identifying object 542 as a URL input.

During runtime of the software application, one or more sanitization rules may assign one or more sanitization tags 540 to object 542. For example, a sanitization rule may assign text escaping sanitization tag 540 to object 542 after the software application calls a sanitization method that checks text in object 542. The software application then may call an output method, such as response.write( ) method 514 that writes object 542 to a page. Output rule 512 in FIG. 7 may assign page output tag 516 to response.write( ) output method 514.

RTA 218 may define multiple different vulnerabilities, including but not limited to, defined vulnerabilities 520 and 544. As described above, defined vulnerability 520 may identify a hierarchical page output 520A, a hierarchical HTTP input 520B, and a text escaping sanitization 520C. Defined vulnerability 544 may identify a hierarchical URL output 544A, a hierarchical HTTP input 544B, and an access check sanitization 544C.

RTA 218 performs a hierarchical analysis of defined vulnerabilities 520 or 544 in response to output rule 512 in FIG. 7 assigning output tag 516 to output method 514. RTA 218 identifies [HTTP OUTPUT→PAGE OUTPUT] subtree 522 by walking down output tree 504 from the HTTP root output to page output tag 516. In this example, defined vulnerability page output 520A is part of subtree 522. In other words, page output tag 516 is a type of page output 520A in defined vulnerability 560.

Based on the inclusion of page output 520A in subtree 522. RTA 218 compares the hierarchical relationship between input tag 510 and input 520B in defined vulnerability 520. RTA 218 identifies [URL INPUT→HTTP INPUT] subtree 524 by walking up input tree 502 from the more specific input tag 510 assigned to object 542 (e.g. URL input) to a higher level HTTP input 520B in defined vulnerability 520. Subtree 524 indicates URL input tag 510 is of type HTTP input 520B.

Based on the inclusion of page output 520A in subtree 522 and the inclusion of HTTP input 520B in subtree 524, RTA 218 checks sanitation tag 540 assigned to object 542 with sanitization 520C in defined vulnerability 520. In this example, sanitization tag 540 indicates the software application performed the text escaping sanitization operation on object 542 identified by sanitization 520C in defined vulnerability 520. Therefore, RTA 218 does not identify output method 514 as a vulnerability. RTA 218 may have identified output method 514 as a vulnerability if input object 542 did not include text escaping sanitization tag 540.

RTA 218 also compares output method 514 with defined vulnerability 544. In this example, URL output 544A in defined vulnerability 544 is not part of [HTTP OUTPUT→PAGE OUTPUT] subtree 522. In other words, page output tag 516 is not a type of URL output 544A in defined vulnerability 544. Therefore, RTA 218 disregards defined vulnerability 544 as a potential vulnerability.

Figure 9:
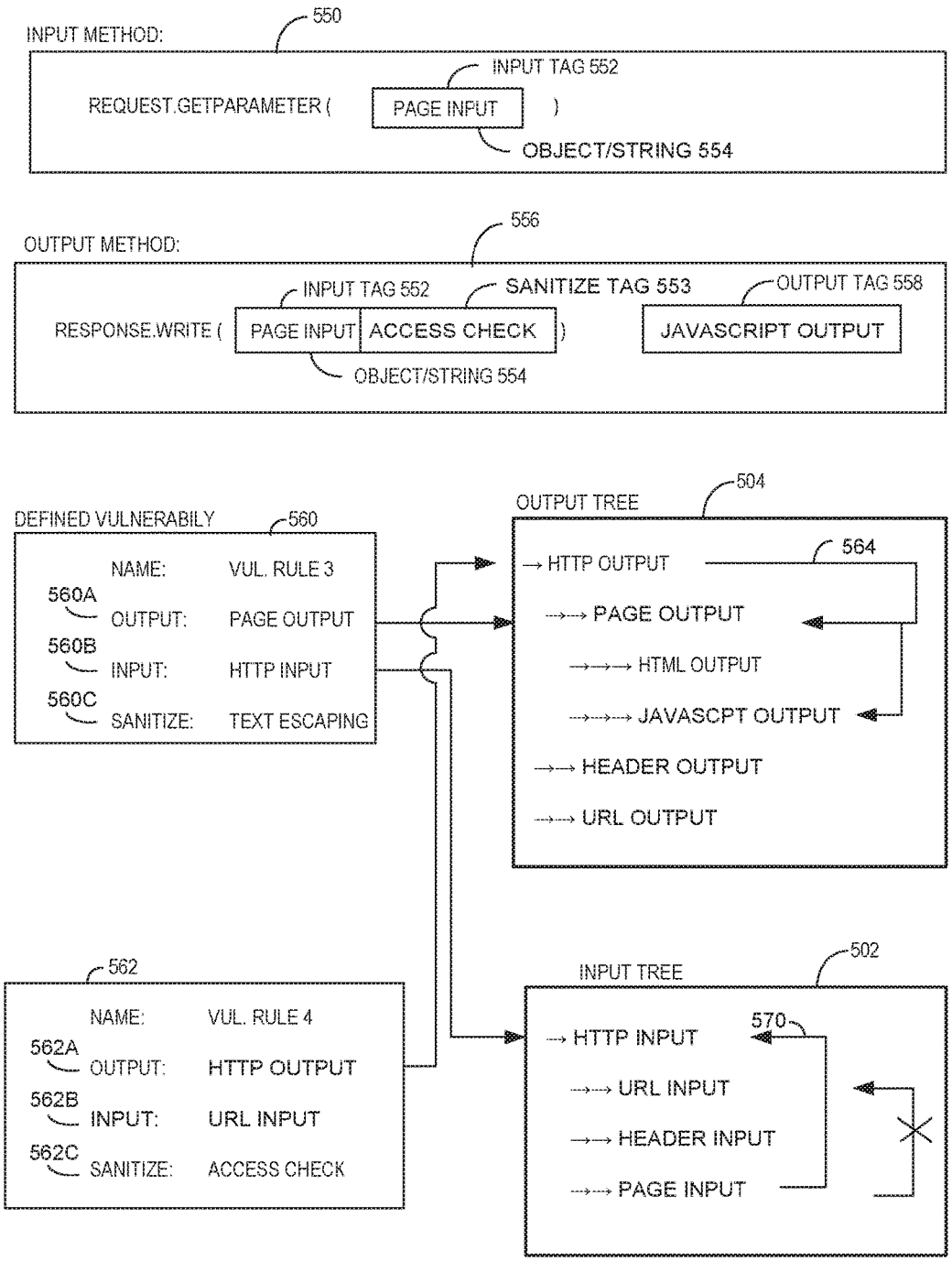
FIG. 9 shows another example of the hierarchical tagging scheme.

FIG. 9 shows another example of the hierarchical tagging scheme. During software application runtime an input rule may assign a hierarchical page input tag 552 to an input object 554 called by input method 550. Also during runtime of the software application, an RTA output rule may assign a hierarchical JavaScript output tag 558 to an output method 556 that outputs object 554. For example, input method 550 may receive a page input and output method 556 may output JavaScript.

A defined vulnerability 560 identifies a page output 560A, a HTTP input 560B, and a text escaping sanitation 560C. A defined vulnerability 562 may identify a HTTP output 562A, a URL input 562B, and an access check 562C.

JavaScript output tag 558 forms [HTTP OUTPUT→PAGE OUTPUT→JAVASCRIPT OUTPUT] subtree 564 in output tree 504 and page output 560A in defined vulnerability 560 is part of subtree 564. Page input tag 552 is part of a [PAGE INPUT→HTTP INPUT] subtree 564 in input tree 30. In other words, page input tag 552 is a type of HTTP input 560B in defined vulnerability 560.

Based on the inclusion of page output 560A in subtree 564 and input tag 552 in subtree 570, RTA 218 compares sanitization tag 553 with sanitization 560C in defined vulnerability 560. Since access check tag 553 is not a text escaping sanitation check 560, RTA 218 identifies output method 556 as a vulnerability.

RTA 218 also checks output tag 558 with defined vulnerability 562. HTTP output 562A in defined vulnerability 562 is also part of [HTTP OUTPUT→PAGE OUTPUT→JAVASCRIPT OUTPUT] subtree 564 in output tree 504. However, page input tag 552 is a sibling and not a type of URL input 562B. Therefore, RTA 218 does not consider defined vulnerability 560 a potential vulnerability and does not compare sanitization tag 553 with sanitization 562C.

Figure 10:
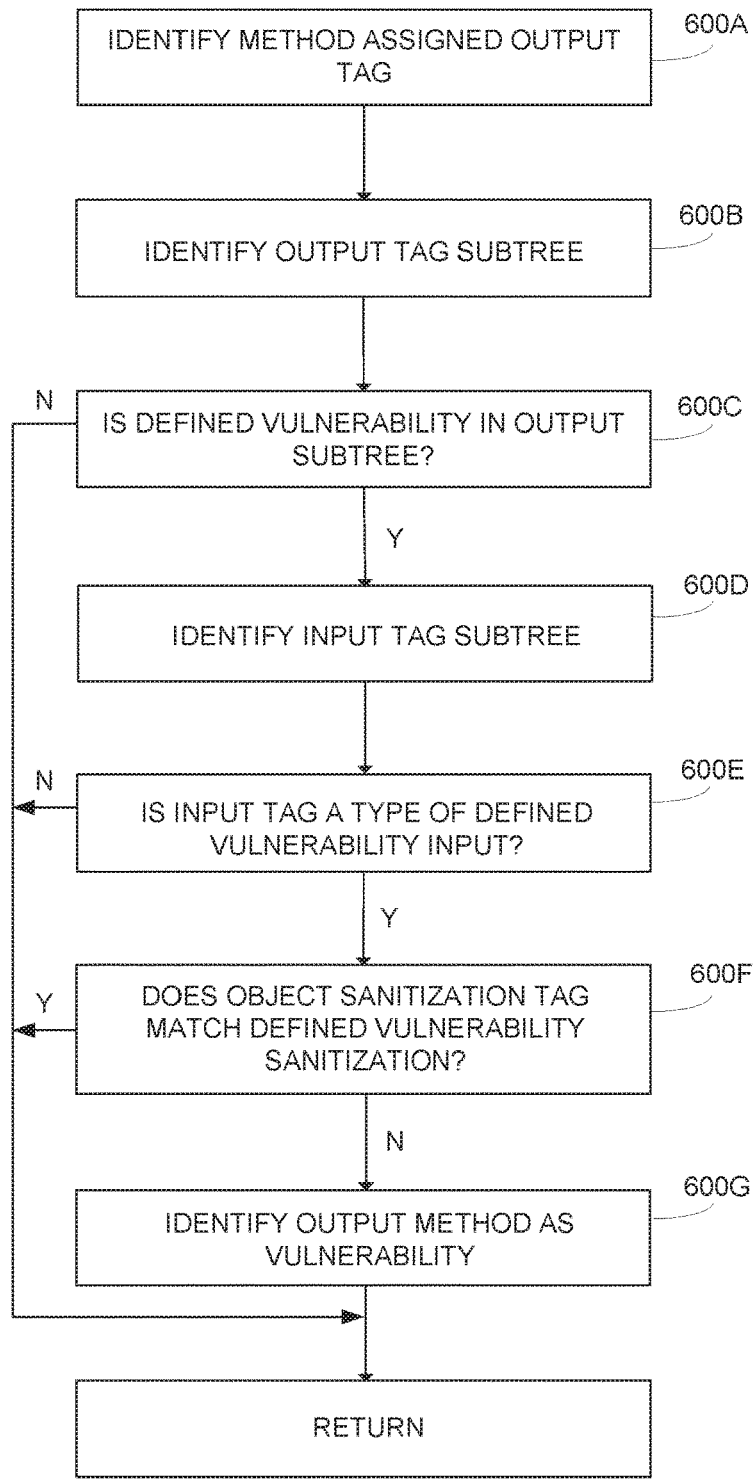
FIG. 10 shows an example process for using the hierarchical tagging scheme for identifying security vulnerabilities in a software application.

FIG. 10 shows an example process for the hierarchical tagging scheme. In operation 600A, the RTA identifies an output method assigned an output tag. For example, an output rule may assign an output tag to an output method that outputs an object.

In operation 600B, the RTA may identify a subtree for the output tag. For example, the RTA may walk down from the root of the output tree to the output tag. In operation 600C, the RTA determines if the defined vulnerability output is part of the output subtree. If not, the RTA disregards the defined vulnerability and checks the subtree for a next defined vulnerability.

If the defined vulnerability output is part of the output subtree, the RTA in operation 600D identifies the input subtree for the object input tag. For example, the RTA may walk up the input tree from the input tag to the defined vulnerability input. In operation 600E, the RTA determines if the input tag is a type of defined vulnerability input. For example, the RTA determines if the input tag is a same type or child of the vulnerability input. If not, the RTA disregards the defined vulnerability and checks the next defined vulnerability.

If the input tag is a type of defined vulnerability input, the RTA in operation 600F compares the object sanitization tags with the defined vulnerability sanitization tag. If none of the object sanitization tags match the defined vulnerability sanitization tag, the RTA identifies the output method as a vulnerability in operation 600G. If the object sanitization tag matches the same defined vulnerability sanitization tag, the RTA dismisses the defined vulnerability and checks the next defined vulnerability. For example, if some other sanitization tag is present for the object but is not the sanitization tag in the defined vulnerability, the software flow in the software application would be marked as a vulnerability.

The input, output, and vulnerability rules are highly extensible and detection of already defined vulnerabilities can easily be added as new Java methods. New vulnerability types can also easily be added to existing events with Java method mappings. JavaScript object notation (JSON) files may include event types, hierarchy, and mappings and may be parsed and compiled into a map and stored as serialized byte-code. The parsing/serialization may happen at compile time.

During execution of the runtime analysis, the serialized byte-code representation may be loaded in memory and used to detect vulnerabilities. Each JSON is parsed into a tree based representation as described above with each event in the map having an associated parent/child relationship. Once the input and output trees are populated, each tree element is stored in a hash map while preserving the parent/child relationship, so that any identified event we can be located with respect to other elements. The serialized form of the input tree and output tree hash maps provide more efficient memory and computation utilization.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures. i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java. C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program product comprising a non-transitory computer-readable medium containing an executable set of instructions for detecting potential vulnerabilities in a software application in a database system, the set of instructions operable to:
receive a hierarchical list of input tags defining a hierarchy of requests received by the software application, wherein at least some of the input tags have hierarchical relationships, wherein the hierarchical list of input tags includes a parent hypertext transfer protocol (HTTP) input tag and child sibling page, header, and universal resource locator (URL) input tags;
receive a hierarchical list of output tags defining a hierarchy of outputs generated by the software application, wherein at least some of the output tags have hierarchical relationships, wherein the hierarchical list of output tags includes a parent hypertext transfer protocol (HTTP) output tag and child sibling page, header, and universal resource locator (URL) output tags;
receive defined vulnerabilities wherein the defined vulnerabilities include at least one associated input tag and at least one associated output tag;
receive a request in the database system from a user system;
assign an input tag from the hierarchical list of input tags to an object associated with the request, the input tag identifying the request as carrying a security risk and identifying a type of data within object and a particular type of user input, including a URL input;
assign an output tag from the hierarchical list of output tags to an output method generating a response to the request; and
identify one of the defined vulnerabilities as a candidate vulnerability when the assigned output tag and output tag associated the defined vulnerability are within a same subtree in the hierarchical list of output tags; and
identify the candidate vulnerability as a potential vulnerability when the assigned input tag and the input tag associated with the candidate vulnerability are within a same subtree in the hierarchical list of input tags.

2. The computer program of claim 1, further comprising instructions operable to:
identify an output subtree in the hierarchical list of output tags from a root output tag down to the assigned output tag; and
identify the assigned output tag as a type of the output tag associated with the potential vulnerability when the output tag associated with the potential vulnerability is located in the output subtree.

3. The computer program of claim 2, further comprising instructions operable to:
identify an input subtree in the hierarchical list of input tags from the assigned input tag up to a root input tag; and
identify the assigned input tag as a type of input tag associated with the potential vulnerability when the input tag associated with the potential vulnerability is located in the input subtree.

4. The computer program of claim 1, wherein the child sibling page output tags include child sibling hypertext markup language (HTML) and JavaScript output tags.

5. The computer program of claim 1, further comprising instructions operable to identify the potential vulnerability as an actual vulnerability in the software application when a sanitization tag associated with the potential vulnerability are not a same sanitization tag assigned to the object.

6. The computer program of claim 1, further comprising instructions operable to assign the input tag to the object based on a type of input method receiving the request and assign the output tag based on a type of method generating the response to the request.

7. The computer program of claim 1, further comprising instructions operable to generate rules in bytecode of the software application to assign the input tag, assign the output tag, and identify the potential vulnerability.

8. A system for detecting vulnerabilities in a software application operating in a database system, comprising:
a processor; and
memory storing one or more stored sequences of instructions which, when executed by the processor, cause the processor to carry out the steps of:
receiving a hierarchical list of input tags defining a hierarchy of requests received, wherein the hierarchical list of input tags includes a parent hypertext transfer protocol (HTTP) input tag and child sibling page, header, and universal resource locator (URL) input tags;
receiving a hierarchical list of output tags defining a hierarchy of outputs, wherein the hierarchical list of output tags includes a parent hypertext transfer protocol (HTTP) output tag and child sibling page, header, and universal resource locator (URL) output tags;
receiving defined vulnerabilities each including an associated input tag and an associated output tag;
receiving a request by the software application in the database system from a user system;
assigning an input tag from the hierarchical list of input tags to an object returned by the software application based on the request, the input tag identifying the request as potentially malicious and carrying a security risk and identifying a type of data within object and a particular type of user input, including a URL input;
assigning an output tag from the hierarchical list of output tags to an output method in the software application generating a response to the request;
identifying one of the defined vulnerabilities as a candidate vulnerability when the assigned output tag and output tag associated the defined vulnerability are within a same subtree in the hierarchical list of output tags; and
identifying the candidate vulnerability as a potential vulnerability when the assigned input tag and the input tag associated with the candidate vulnerability are within a same subtree in the hierarchical list of input tags.

9. The system of claim 8, wherein the instructions further cause the processor to carry out the steps of assigning the input tag, assigning the output tag, and identifying the potential vulnerability during runtime of the software application.

10. The system of claim 8, wherein the instructions further cause the processor to carry out the steps of identifying the potential vulnerability as an actual vulnerability in the software application when a sanitization tag associated with the potential vulnerability are not a sanitization tag assigned to the object.

11. The system of claim 8, wherein the instructions further cause the processor to carry out the steps of identifying the assigned output tag and the output tag associated with the potential vulnerability as part of the same subtree when the assigned output tag is identified as a same type or child of the output tag associated with the potential vulnerability.

12. The system of claim 8, wherein the instructions further cause the processor to carry out the steps of identifying the assigned input tag and the input tag associated with the potential vulnerability as part of the same subtree when the assigned input tag is identified as a same type or child of the input tag associated with the potential vulnerability.

13. The system of claim 8, wherein:
the child sibling page output tag includes child sibling hypertext markup language (HTML) and JavaScript output tags.

14. The system of claim 8, wherein at least some of the stored sequences of instructions include Java bytecode for assigning the input tag, assigning the output tag, and identifying the potential vulnerability.

15. A method for detecting a vulnerability in a software application in a database system, comprising:
storing a hierarchical input tree that identifies hierarchical relationships for different input events;
storing a hierarchical output tree that identifies hierarchical relationships for different output events;
receive a defined vulnerability that includes an output event, an input event, and a sanitization event;
receiving by the software application in the database system a request from a user system;
executing an input rule in the software application that identifies an input event for an object associated with the request;
executing a sanitization rule in the software application that identifies a sanitization event for a security operation performed on the object;
executing an output rule in the software application that identifies an output event for a method generating a response to the request; and
executing a vulnerability rule in the software application that identifies a vulnerability in a part of the software application based on a hierarchical relationship between the identified output event and the defined vulnerability output event, a hierarchical relationship between the identified input event and the defined vulnerability input event, and a relationship between the identified sanitization event and the defined vulnerability sanitization event.

16. The method of claim 15, further comprising identifying the vulnerability in the software application when a sanitization event identified for the object is not the defined vulnerability sanitization event.

* * * * *